June 17, 1969  R. E. JONES  3,450,223

FERTILIZER APPLICATOR APPARATUS

Filed July 3, 1967

INVENTOR.
RUSSELL E. JONES
BY
Schmieding & Fultz
ATTORNEYS

INVENTOR.
RUSSELL E. JONES
BY
Schmieding & Fultz
ATTORNEYS

# United States Patent Office 3,450,223
Patented June 17, 1969

3,450,223
FERTILIZER APPLICATOR APPARATUS
Russell E. Jones, Rte. 1, Kingston, Ohio 45644
Filed July 3, 1967, Ser. No. 650,840
Int. Cl. B62d 61/08, 39/00
U.S. Cl. 180—27     3 Claims

ABSTRACT OF THE DISCLOSURE

A self-propelled fertilizer applicator apparatus which is adapted for use in cultivated fields even under very wet, muddy soil conditions. The frame of the apparatus is constructed in a manner to minimize the total weight and to lower the center of gravity to increase stability when hillsides or field depressions are to be negotiated. The frame comprises in general a forwardly extending upper platform that supports a truck type cab and a rearwardly extending lower platform that supports a large fertilizer container and fertilizer applying means. The self-propelling engine is mounted on the lower platform beneath a portion of the upper platform and the cab. The applicator apparatus also includes a dual brake system which employs both shoe brakes and disc brakes in a parallel hydraulic circuit for simultaneous actuation by a manually operated foot pedal.

---

The present invention relates generally to farm equipment and particularly to a novel self-propelled fertilizer applicator which is adapted for all-weather use.

In general, the fertilizer applicator of the present invention comprises a novel frame means which supports a cab and engine in addition to a fertilizer container and means for applying the fertilizer. The frame means is in turn supported by a tri-wheel arrangement of two rear wheels and a single front wheel.

One of the major problems for farmers in applying fertilizer to cultivated fields is the terrific influence of wet weather which may cause irreparable delay since fertilizer must be applied during a specific time period to be effective.

A relatively recent development in this area has arisen in the use of self-propelled fertilizer applicators which are adapted to operate under the most adverse wet field conditions. The principle of this type of applicator involves the use of extra-large tires, which are very expensive to support the weight of the applicator in a manner which spreads the weight of the vehicle over a greater area therefore reducing the soil pressure that causes rutting and gouging in wet fields. Not only is the applicator able to move through extremely wet fields but since rutting and gouging is reduced, soil erosion is greatly reduced.

In accordance with the fertilizer applicator of the present invention, the frame means is constructed to permit the cab, engine and load to be disposed in a compact manner which reduces the overall weight of the machine. By reducing the overall weight, it is also possible to use smaller and less expensive tires than the prior art machines and also reduce soil pressure as compared to prior self-propelled fertilizer applicator machines.

As another aspect of the present invention, the brake system employs dual braking means comprising both shoe type brakes and a disk brake operated simultaneously within the same hydraulic circuit.

As another aspect of the present invention, the frame construction promotes a lower center of gravity to provide an apparatus having greater stability to permit safe maneuvering even on hillsides, field depressions and the like.

It is therefore an object of the present invention to provide an apparatus of the type described which includes a novel frame construction, reduces overall weight, and reduces costs as compared to analogous prior art machines.

It is another object of the present invention to provide an apparatus of the type described which employs a dual brake system to insure safe braking of the vehicle.

It is still another object of the present invention to provide an apparatus of the type described which is more stable and more maneuverable under adverse conditions in the field as compared to analogous prior art apparatus.

Further objects and advantages of the present invention will be apparent from the following description, reference being had to the accompanying drawings wherein preferred forms of embodiments of the invention are clearly shown.

Figure 1:
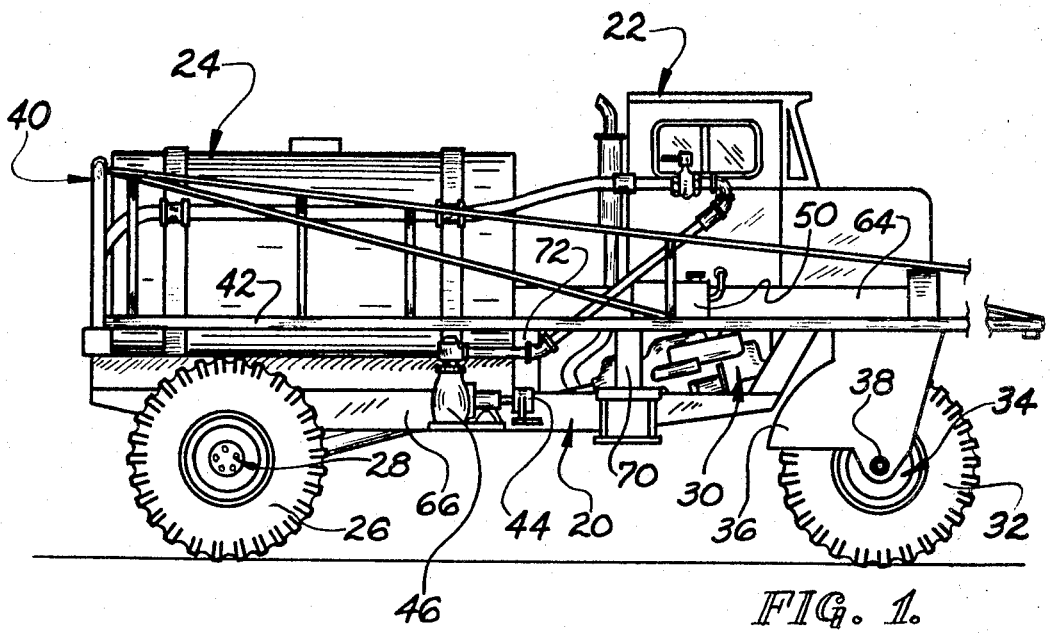
FIG. 1 is a right side elevational view of a self-propelled fertilizer applicator constructed in accordance with the present invention.
Figure 2:
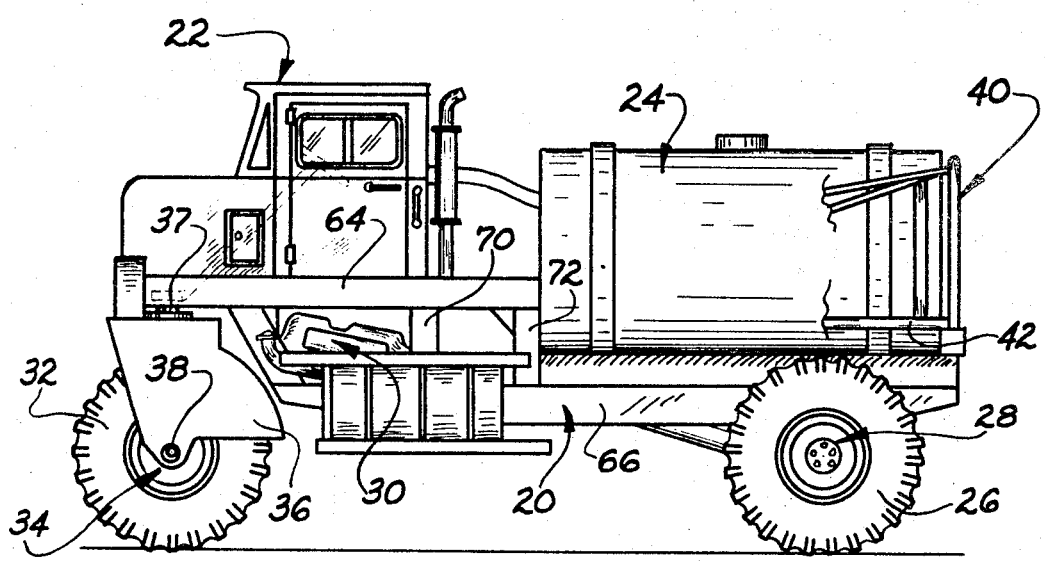
FIG. 2 is a left side elevational view of the apparatus shown in FIG. 1.
Figure 3:
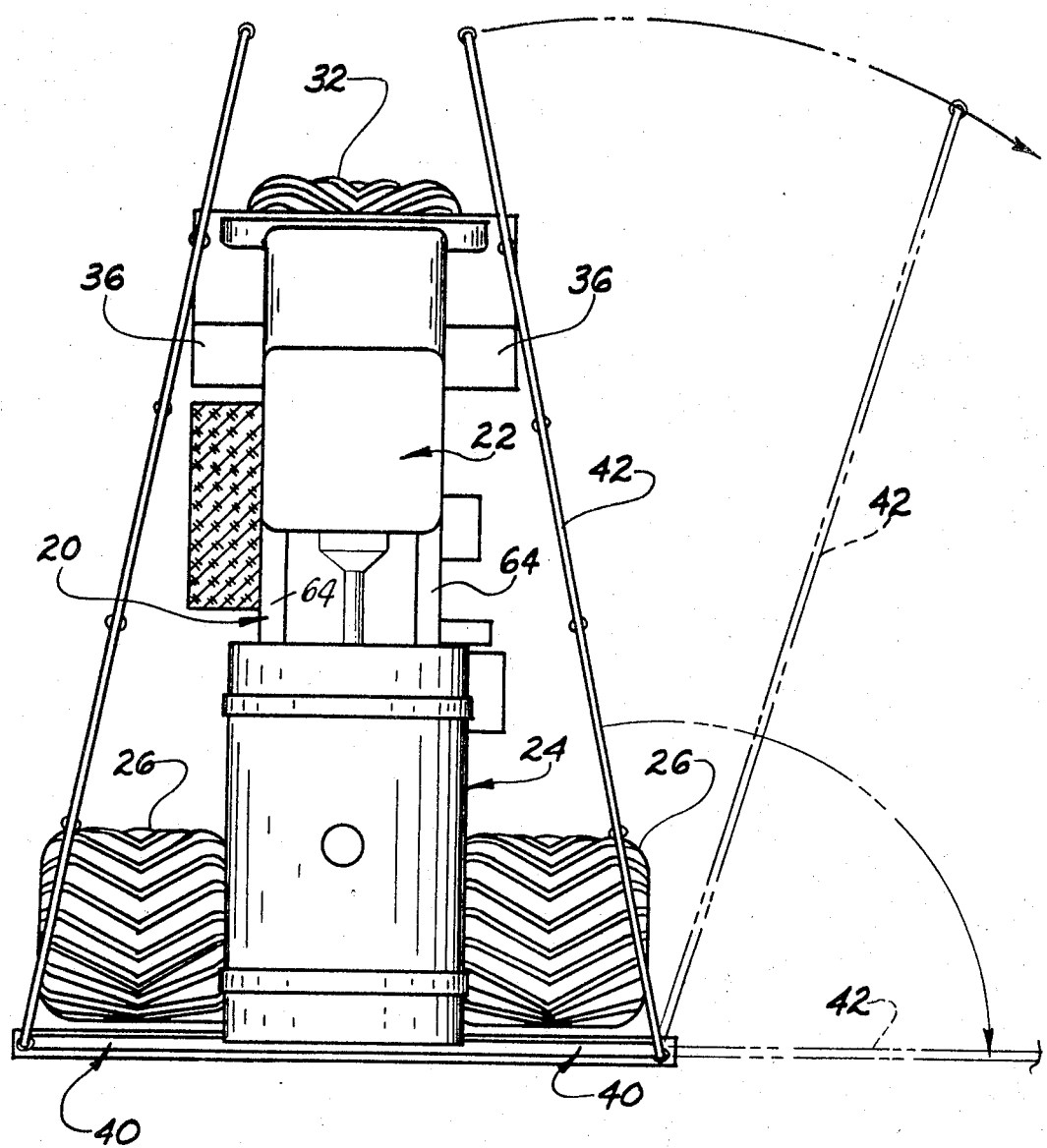
FIG. 3 is a top plan view of the apparatus shown in FIG. 1.
Figure 4:
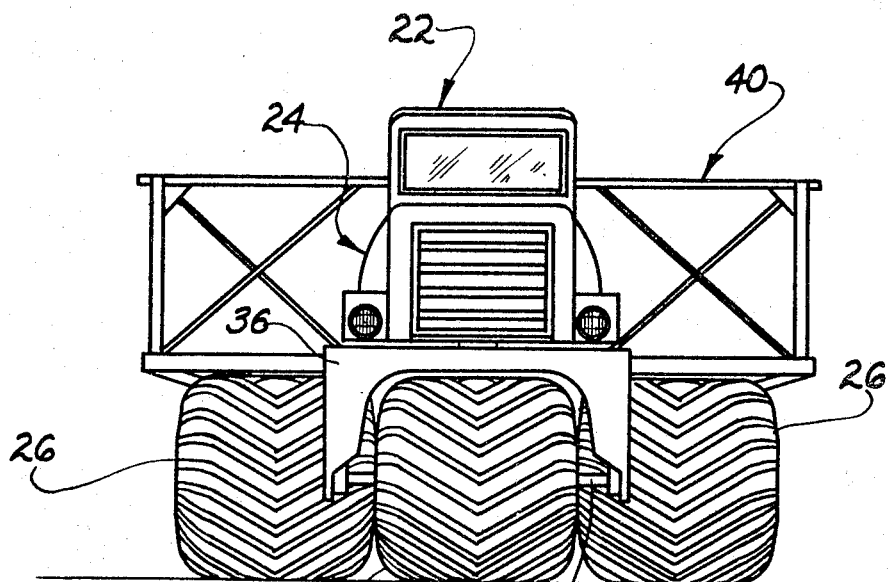
FIG. 4 is a front elevational view of the apparatus shown in the preceding figures.
Figure 5:
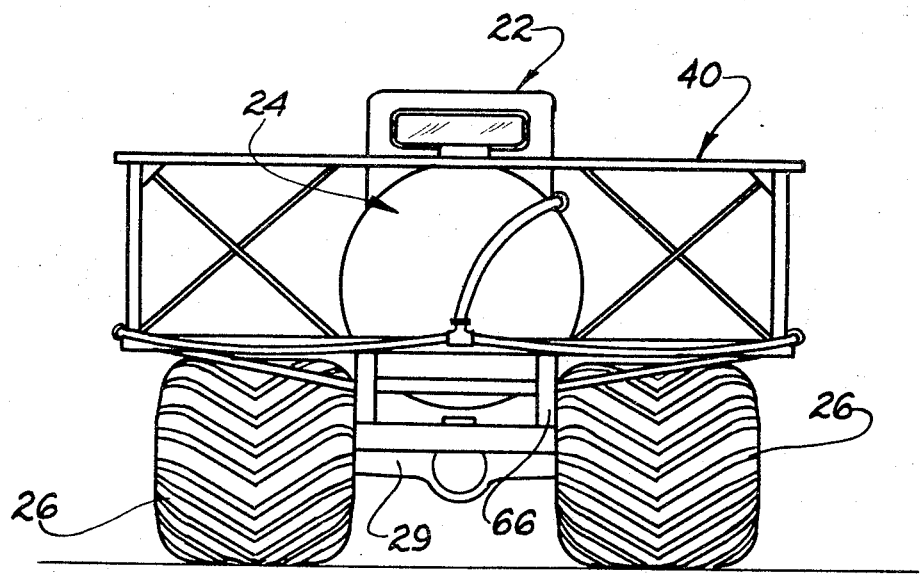
FIG. 5 is a rear elevational view of the apparatus shown in the preceding figures.

Referring in detail to the drawings, an apparatus for applying fertilizer constructed in accordance with the present invention is illustrated in FIGS. 1–5 and includes a frame means, indicated generally at 20, which supports a cab portion indicated generally at 22 and a fertilizer container 24.

An over-sized tire 26 is mounted on each rear wheel assembly indicated generally at 28 which are in turn connected to frame means 20.

Rear wheel assemblies 28 are connected to a conventional drive shaft and truck gear axle 29 which in turn are operatively connected to a conventional truck-type combustion engine indicated generally at 30.

Another over-sized tire 32 is mounted on the front wheel assembly, indicated generally at 34, which includes a fork frame member 26.

Fork frame member 36 is connected to opposite ends of a shaft 38 which extends outwardly from tire 32. Front wheel assembly 34 is turned by a conventional power steering and linkage mechanism which is not shown but is connected in a conventional manner to a manually operated steering wheel disposed in cab 22.

A fertilizer applying means 40 includes a pair of large collapsible wings 42 provided with spaced nozzles, not shown, mounted on the rear of frame 20.

Figure 7:
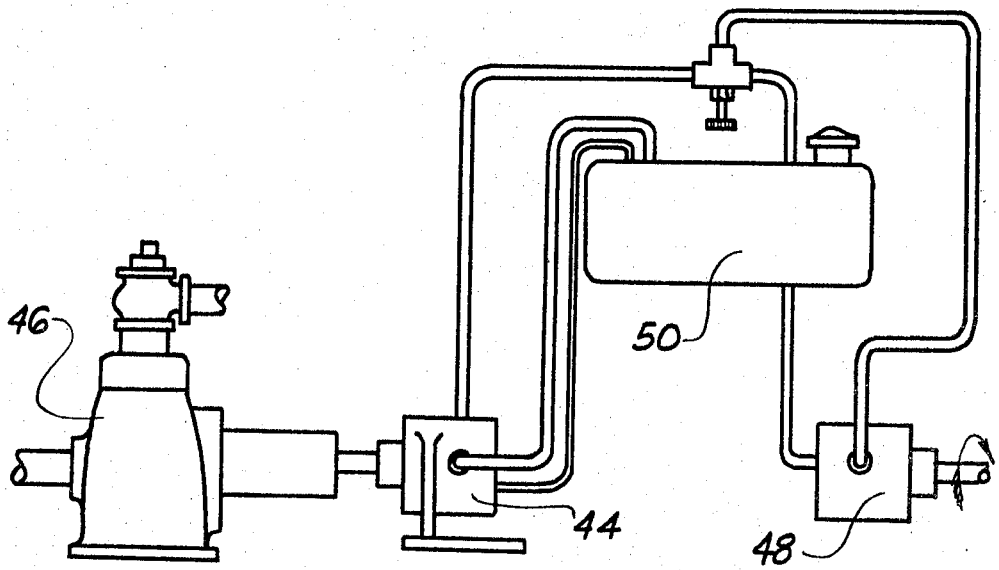
FIG. 7 is a diagrammatic view of the hydraulic circuit for pumping the fertilizer from the fertilizer container of the apparatus of the present invention.

Now referring to FIG. 7, a hydraulic circuit is diagrammatically illustrated which forms the means for pumping the fertilizer out of container 24 into the nozzles in the applying means 40.

A fluid motor 44 drives a pump 46 that feeds the liquid fertilizer out through piping to the nozzles in the wings 42. Fluid motor 44 is driven by another fluid motor 48 which in turn is driven off the fan belt, not shown, of engine 30. A reservoir 50 is provided to maintain a supply of fluid. Fluid motor 48 draws fluid from reservoir 50 and drives motor 44 when a valve 51 is manually opened. When valve 51 is closed, fluid is pumped out of applying means 40.

Figure 8:
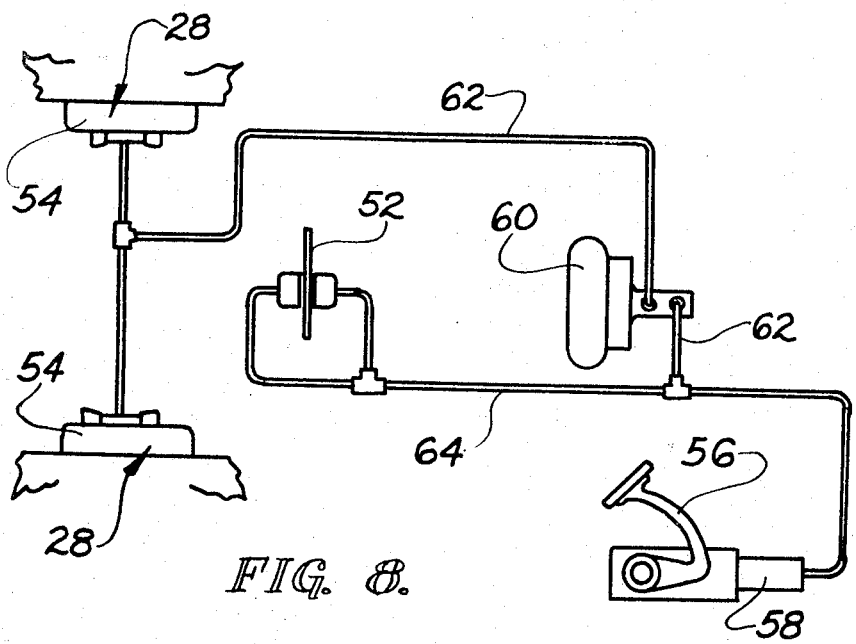
FIG. 8 is a diagrammatic view of the hydraulic braking circuit employed in the apparatus of the present invention.

Now referring to FIG. 8, the brake system for the present invention is diagrammatically illustrated and includes both shoe type brakes and a disc brake. Prior art apparatus analogous to the present invention, have only used standard shoe brakes, however, since the apparatus represents very large and heavy equipment and must travel on roads as well as fields, should failure of the standard shoe brakes occur, a most hazardous situation develops. Further, I have found that standard shoe brakes alone, even under the best circumstances, do not provide adequate braking power in emergency situations for quick, positive stops.

Therefore, I have provided a disc type brake 52 in parallel with standard shoe brakes 54 disposed in rear wheel assemblies 28. Both sets of brakes are manually operated from one foot lever 56 disposed in cab 24 which is connected to a piston-cylinder assembly 58. A hydraulic booster 60 is provided in the line 62 which is connected to the shoe brakes 54 but the line 64 is connected directly to disc brake 52 and by-passes booster 60 as less pressure is needed to operate the disc brake efficiently than is necessary for the operation of the shoe brakes. Should either one of the sets of brakes fail for mechanical reasons, the operator still has the other type of brake to stop the apparatus.

Figure 6:
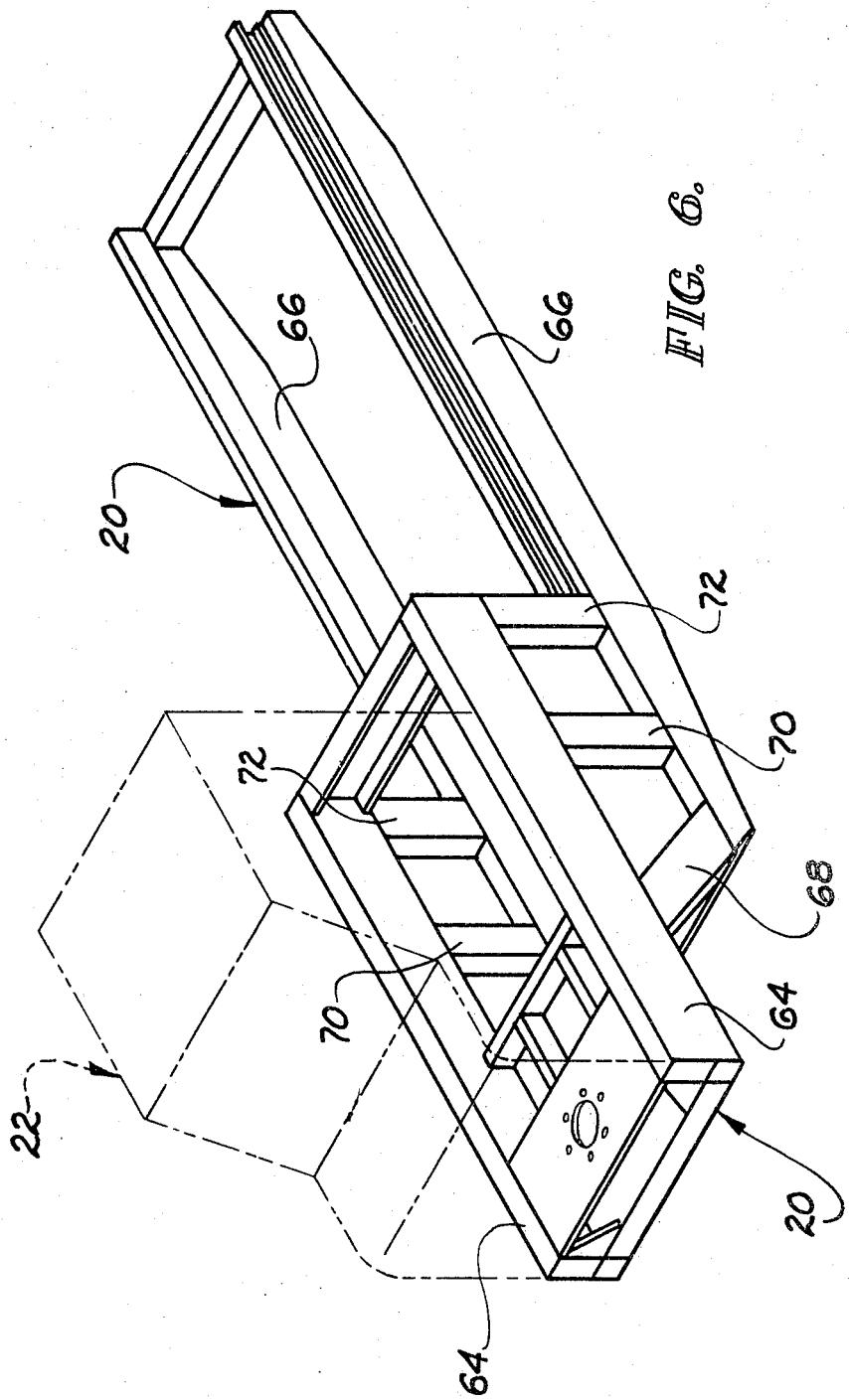
FIG. 6 is a perspective view showing a portion of the apparatus of FIG. 1 illustrating the novel frame means shown in isolated relationship.

Now referring specifically to FIG. 6, a portion of the apparatus of the present invention is shown with the frame means 20 being illustrated in isolated relationship.

Frame means 20 includes a forwardly extending main frame member 64 and rearwardly extending main frame member 66. An inclined supporting frame member 68 is welded between frame members 64 and 66 as are two vertical supporting frame members 70 and 72.

The opposite side of frame means 22 is identically constructed as described above.

Forwardly extending frame members 64 provide a platform for cab 22 and also includes a bore for a steering shaft 37 which is connected to the conventional power steering unit, not shown.

Rearwardly extending frame members 66 provide a platform for fertilizer container 24 and is connected directly to the rear wheel assembly. There is no type of vehicle suspension used.

The engine 30 is mounted on the frame between the supporting frame members 68, 70 and 72.

It is important to point out that the construction of frame means 22 described above promotes compact construction which eliminates substantial overall weight and further provides for a low center of gravity.

The cab 24 is located over the engine to shorten the entire structure and yet, the center of gravity is also lowered, because the heavy fertilizer container 24 which carries a large payload is still disposed substantially on the lower platform at a low level relative to the tires 26.

The less bulk and overall weight of the above described construction also permits the use of smaller diameter tires which further reduces the center of gravity.

The smaller tires are less expensive than the larger tires needed for the prior art self-propelled fertilizer applicators and yet because of the less overall weight of the apparatus of the present invention, there is no greater soil pressure exerted. Further, it should be pointed out that the apparatus of the present invention carries a comparable large payload of fertilizer as the analogous prior art machines and applies the fertilizer in a very large swath, approximately sixty feet per pass in width.

It should be pointed out that the lower center of gravity of the fertilizer applicator of the present invention is of utmost importance to enable the user to maneuver on hillsides safely without the danger of overturning.

It is also important in relatively level farm land as in many instances a small but rather deep gully or depression is encountered which must be negotiated if the apparatus is to be used efficiently by farmers under all conditions.

While the form of embodiment of the present invention as herein disclosed constitutes a preferred form, it is to be understood that other forms might be adopted, all coming within the scope of the claims which follow.

I claim:

1. A self-propelled vehicle comprising a rigid main frame including an elongated horizontally disposed rear lower frame disposed at a lower level in one plane adapted to provide a lower rear load platform support, an elongated, horizontally disposed forward upper frame disposed at a higher level in a second plane substantially parallel to the first plane to provide an upper forward operator's platform support, said rear lower frame having a forward end portion extending beneath a rear end portion of said upper frame to provide overlapping superimposed vertically spaced portions with an engine-receiving space therebetween but said upper frame extending forwardly beyond said forward end portion of said lower frame, a propelling engine mounted in said engine-receiving space between said overlapping frame portions, vertically extending connecting frame members extending between said overlapping frame portions for rigidly connecting the upper and lower frames in their overlapping vertically spaced relationship, a pair of wheels supporting said lower frame adjacent the rear end thereof and driven from said engine, a single steerable wheel disposed beneath said forwardly extending portion of the upper frame, and steering means connected to said wheel and controllable from said upper portion of said frame.

2. A vehicle according to claim 1 including an operator's cab mounted on said forward upper frame.

3. A vehicle according to claim 1 wherein said vertically extending connecting frame members include forwardly inclined frame members extending from the forward end of said lower frame upwardly to said forward upper frame and other frame members extending perpendicularly from the rear end of said upper frame downwardly to said lower frame.

References Cited

UNITED STATES PATENTS

| | | | |
|---|---|---|---|
| 1,897,164 | 2/1933 | Endocott | 222—178 X |
| 1,934,718 | 11/1933 | Knapp et al. | 222—178 |
| 2,141,267 | 12/1938 | Dillon | 180—89 X |
| 2,947,376 | 8/1960 | Norrie | 180—89 |
| 3,126,475 | 3/1964 | Dafoe | 180—89 |
| 3,163,459 | 12/1964 | Gyori et al. | 105—368 X |
| 3,339,579 | 9/1967 | Lewis et al. | 303—61 |

ROBERT B. REEVES, *Primary Examiner.*

N. L. STACK, JR., *Assistant Examiner.*

U.S. Cl. X.R.

180—89; 222—178